(No Model.)
J. D. BRUBAKER.
DEVICE FOR SIZING TOBACCO LEAVES.
No. 255,764. Patented Apr. 4, 1882.
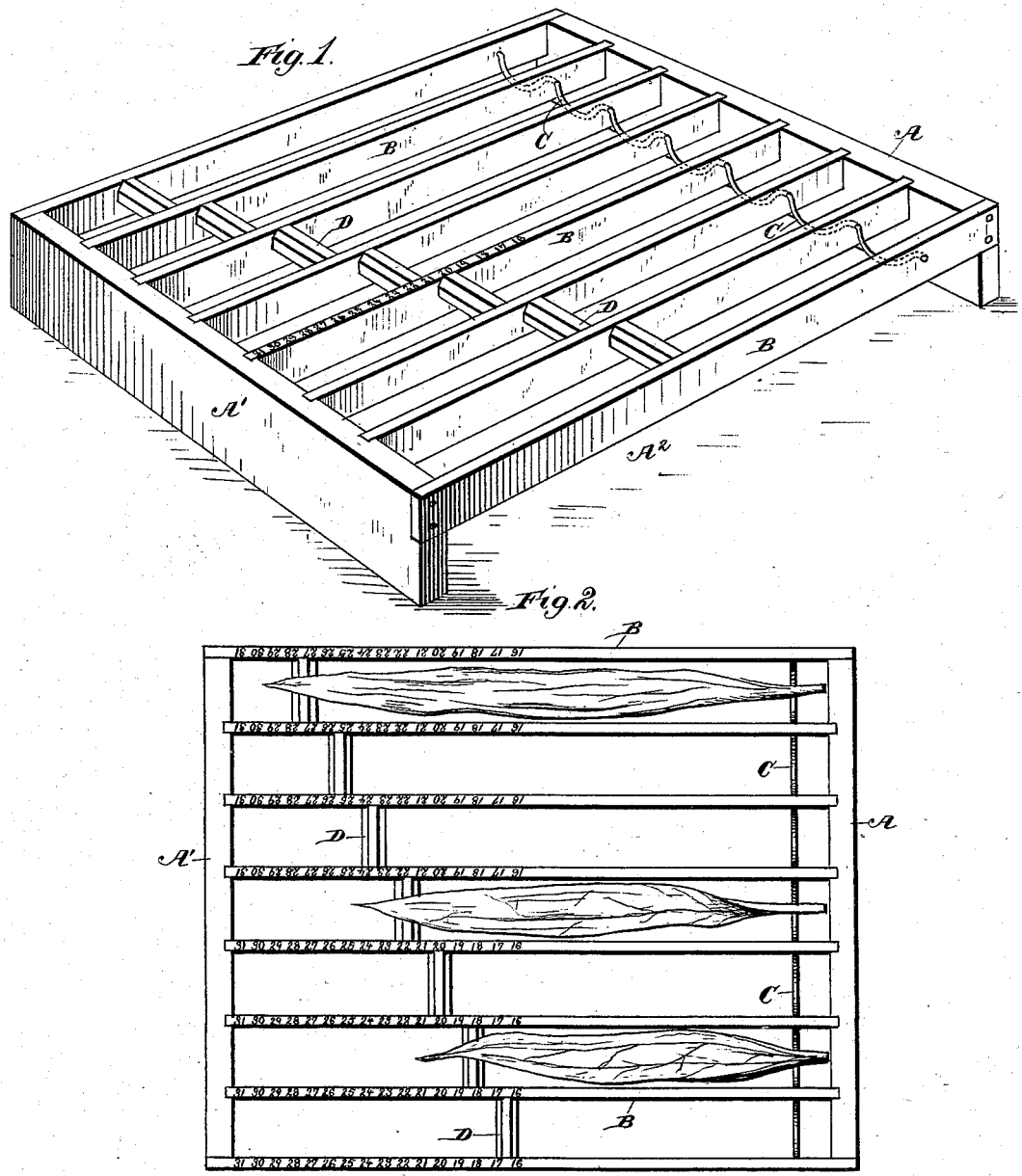
Witnesses.
Robert Everett
Edw. F. Siggers.
Inventor,
John D. Brubaker.
By W. H. Babcock
Atty.

UNITED STATES PATENT OFFICE.

JOHN D. BRUBAKER, OF MANOR TOWNSHIP, LANCASTER COUNTY, PA.

DEVICE FOR SIZING TOBACCO-LEAVES.

SPECIFICATION forming part of Letters Patent No. 255,764, dated April 4, 1882.

Application filed January 10, 1882. (No model.)

*To all whom it may concern:*

Be it known that I, JOHN D. BRUBAKER, a citizen of the United States of America, residing at Manor township, in the county of Lancaster and State of Pennsylvania, have invented certain new and useful Improvements in Devices for Sizing Tobacco-Leaves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to facilitate the work of binding tobacco-leaves in bunches or hands each containing leaves of equal length, by providing a device which will receive the leaves of one length in one space and the leaves of another length in another, so that each hand of leaves before tying is effectually separated from those that make up all the other hands.

Hitherto this sizing (or separation of size from size) has generally been effected by separately measuring the length of every leaf and throwing all of each length into their appropriate pile. This, however, is a tedious and troublesome process. By my invention the leaves are measured in the very act of laying them in place, and one which is found too short or too long may easily be shifted to the neighboring space or compartment where it properly belongs. I also provide for increasing or decreasing the length of each space or compartment, as desired.

To effect the objects above stated I make use of the devices and combinations hereinafter described, and more particularly pointed out in the claims.

In the accompanying drawings, Figure 1 represents a perspective view of a sizing-frame embodying my invention. Fig. 2 represents a top view of the same with the tobacco-leaves laid therein size by size, and Fig. 3 represents a detail view of one of the stops or head-blocks used to gage the length of the leaves.

A and A' designate the end bars of the frame, B designates the parallel longitudinal slats which are connected thereto at intervals, C the wire support for the stalks or butt-ends of the leaves, and D the stops or head-blocks, these being the component parts of my sizing-frame.

The end bars, A A', are of rigid material; but the slats B, which are arranged on edge, have sufficient elasticity to allow their spreading for the removal of the stops D and their closing again on said stops when the latter are replaced between said slats. Each of these stops or head-blocks D has a little pin, $c$, extending from each end, and these pins $c$ $c$ are driven into the slats when they thus close, and the stops or head-blocks are thereby firmly held in place and supported.

The support C for the stalks or butt-ends of the leaves consists, as shown, of a wire which passes through the slats B from side to side of the frame, near end bar A and parallel thereto. This wire or rod has an undulating form, curving down between the slats, so as to present a succession of reversed arches, into which the stalks or butt-ends of the several hands of leaves are set. The size and shape of these curves may be varied at will to give greater or less room for the butt-ends of the leaves. Instead of a wire a cross-slat may be used, suitably cut out into hollows or curves at the top between the longitudinal slats B. These latter slats are graduated on top for at least that half of their length which lies toward end bar A'. They are flush with the top edges of the end bars, but do not extend more than part of the way to the bottom thereof. Consequently there is a considerable space, $A^2$, under the lower edges of said slats B, into which the leaves may sag, as the leaves for each hand increase in number and therefore in weight. This sagging is made possible by arranging the supports C and head-blocks D at a considerable height above the bottom of the frame. If the slats B extended down as far as the end pieces or end bars, A A', do, the sagging would still be practicable provided the supports were high enough; but the space $A^2$ facilitates the removal of the leaves by allowing the operator to pass one hand under them. This construction also saves material. There is obviously a space formed between each stop or head-block D, the two slats which support it, and the end bar A'. These spaces vary in length according to the location of their respective stops D at greater or less distance from end bar A'. The respective spaces or compartments are therefore fitted for leaves of varying sizes—that is, one compartment for one length of leaf and another for another. The leaves are picked up one by one and laid successively into the compartment or space best adapted to receive them. If the graduations on the upper edges of the neighboring slats show the leaf to be too long or too short, it is simply removed to another compartment or space corresponding to the length of the leaf in inches, marked on the upper edge of the longitudinal slats B B.

The movability of the stops is useful to enable the workmen to make a number of hands of the same size of leaf without continually filling and emptying the same compartment or space, for it is easy to make several compartments of the same size by simply shifting the head-blocks to the same point. Other means for attaching them to the slats may be employed—for instance, clamps resting on top of the slats; but I prefer the means shown. Of course, when clamps or similar fastenings are used the slats need not be elastic. As the tobacco leaves accumulate in each space or compartment they sag down between the stalk-supports C and the head-blocks or stops D into the space $A^2$, and thereby afford room on top for additional leaves.

Having thus fully described my invention, what I claim as new, and desire to secure by Letters Patent, is—

1. In a tobacco-sizing frame or support, the combination of end bars, longitudinal slats, a stalk-support, and movable stops or head-blocks.

2. In a tobacco-sizing frame or support, the combination of stops or head-blocks having pins in their ends with elastic slats which close on the same, end bars, and a stalk-support.

3. In a tobacco-sizing frame, a rod or wire forming a series of undulations for the reception of the stalks or butt-ends of the leaves, in combination with slats through which it passes, end bars, and stops or head-blocks, substantially as described.

4. In a frame for sizing tobacco-leaves, the end pieces, in combination with the longitudinal slats, cross-supports for the butts of the leaves, and cross-supports for the tips of the leaves arranged at different distances from the end piece A', and at such heights as to allow sagging, substantially as set forth.

In testimony whereof I affix my signature in presence of two witnesses.

JOHN D. BRUBAKER.

Witnesses:
ZURIEL SWOPE,
CHAS. R. KLINE.